(12) United States Patent
Putnam

(10) Patent No.: US 8,523,489 B1
(45) Date of Patent: Sep. 3, 2013

(54) APPARATUS FOR BURSTING AND REPLACING CONDUITS

(71) Applicant: Samuel W. Putnam, Calhoun, LA (US)

(72) Inventor: Samuel W. Putnam, Calhoun, LA (US)

(*) Notice: Subject to any disclaimer, the term of this patent is extended or adjusted under 35 U.S.C. 154(b) by 0 days.

(21) Appl. No.: 13/659,447

(22) Filed: Oct. 24, 2012

(51) Int. Cl.
*F16L 55/18* (2006.01)
(52) U.S. Cl.
USPC .................................................. 405/184.3
(58) Field of Classification Search
CPC ..................................................... F16L 55/18
USPC ............. 405/184.3, 184.1; 138/97; 173/91, 173/211; 254/29 R; 166/297, 55.1, 55
See application file for complete search history.

(56) References Cited

U.S. PATENT DOCUMENTS

| 3,651,873 | A  | * | 3/1972 | Uebel et al. .................... 173/29 |
| 6,357,967 | B1 |   | 3/2002 | Putnam |
| 2006/0088384 | A1 | * | 4/2006 | Putnam ...................... 405/184.1 |
| 2010/0012336 | A1 | * | 1/2010 | Adamson ......................... 173/1 |

* cited by examiner

*Primary Examiner* — David Bagnell
*Assistant Examiner* — Kyle Armstrong
(74) *Attorney, Agent, or Firm* — R. Keith Harrison

(57) ABSTRACT

An apparatus for bursting and replacing a conduit includes a stored energy and cutting head having a stored energy head cavity; an energy storing assembly including an energy storing head rod disposed in the stored energy head cavity, a washer retainer carried by the energy storing head rod and a plurality of cupped spring washers carried by the energy storing head rod and sandwiched between the washer retainer and the stored energy and cutting head; and a hammer assembly carried by the stored energy and cutting head.

15 Claims, 7 Drawing Sheets

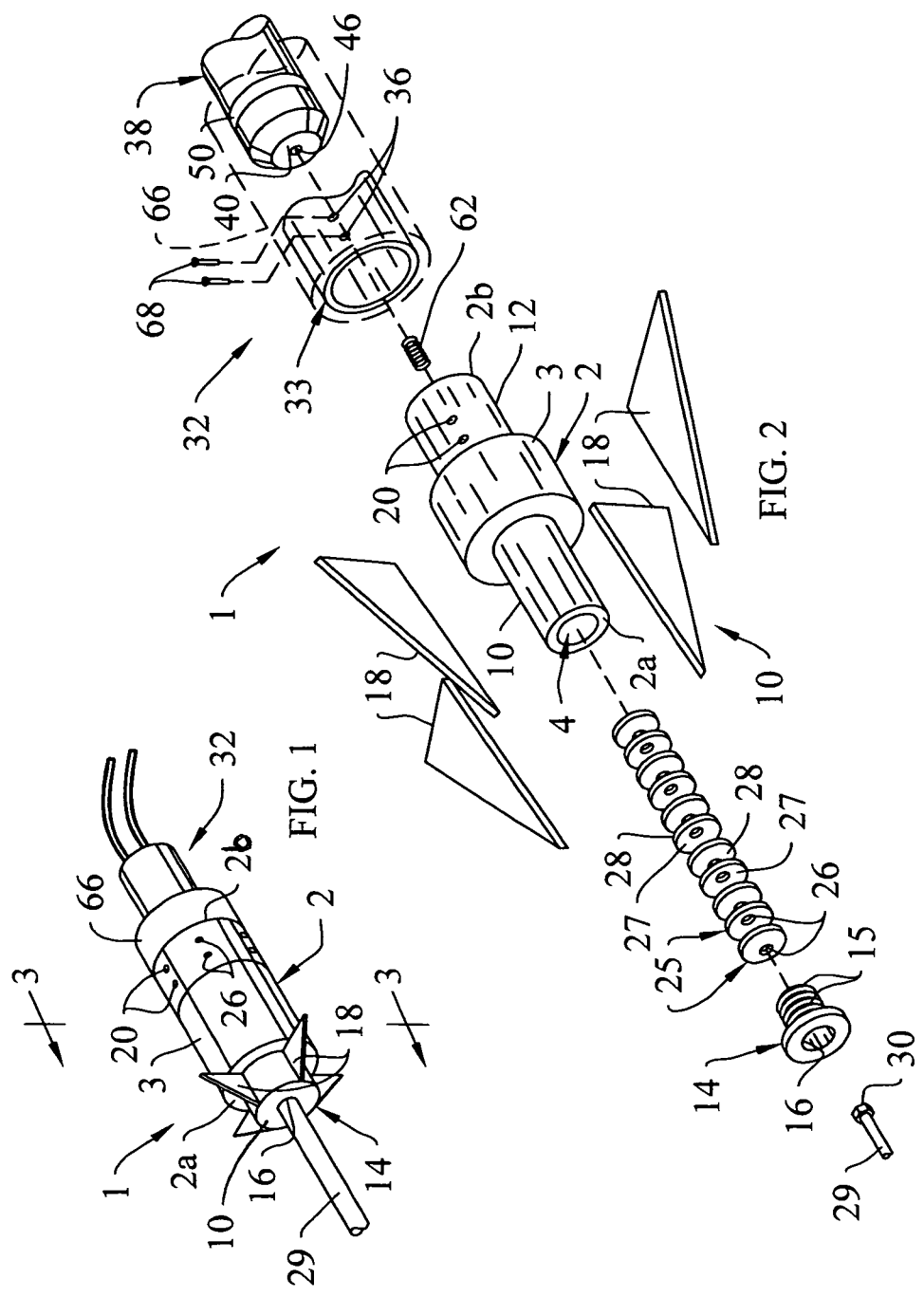

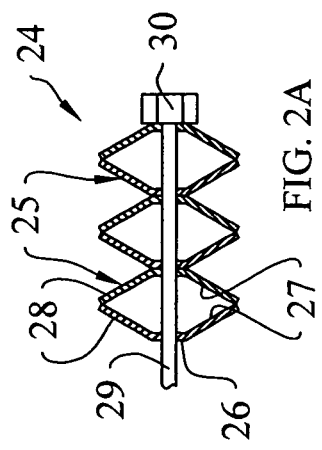
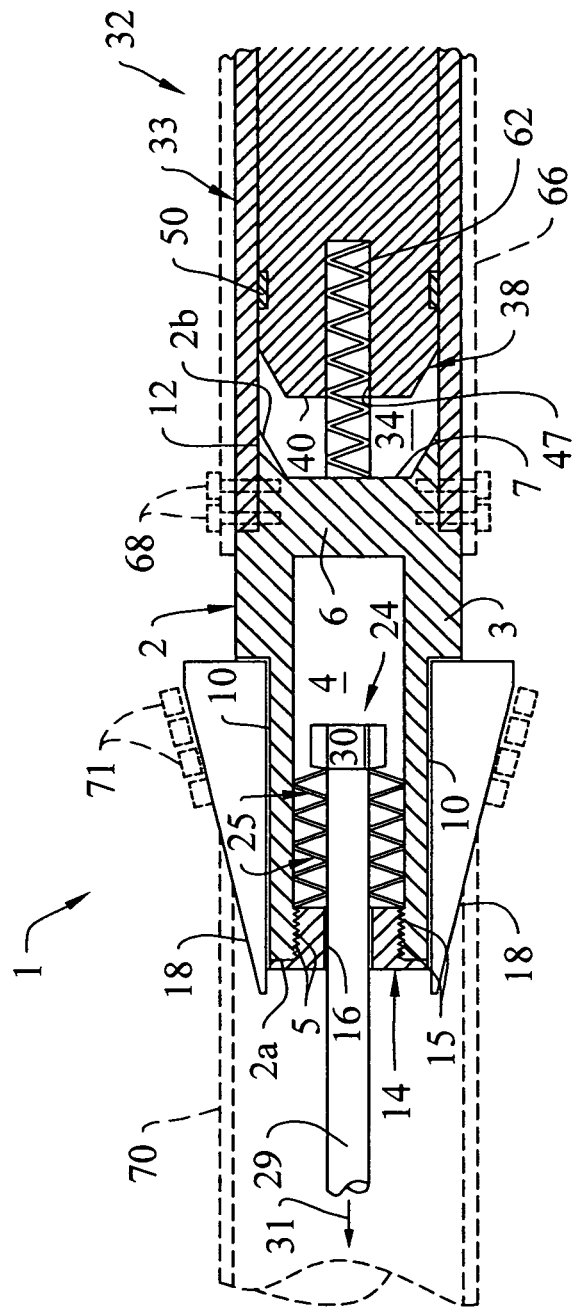
FIG. 2A
FIG. 3

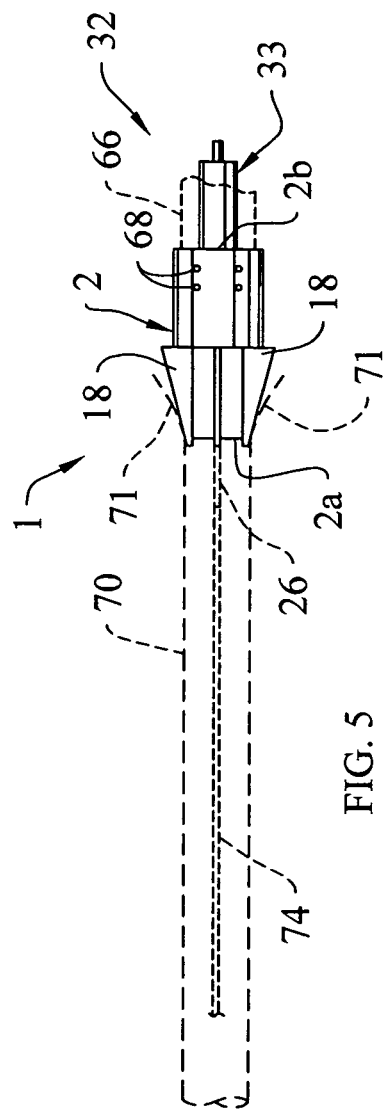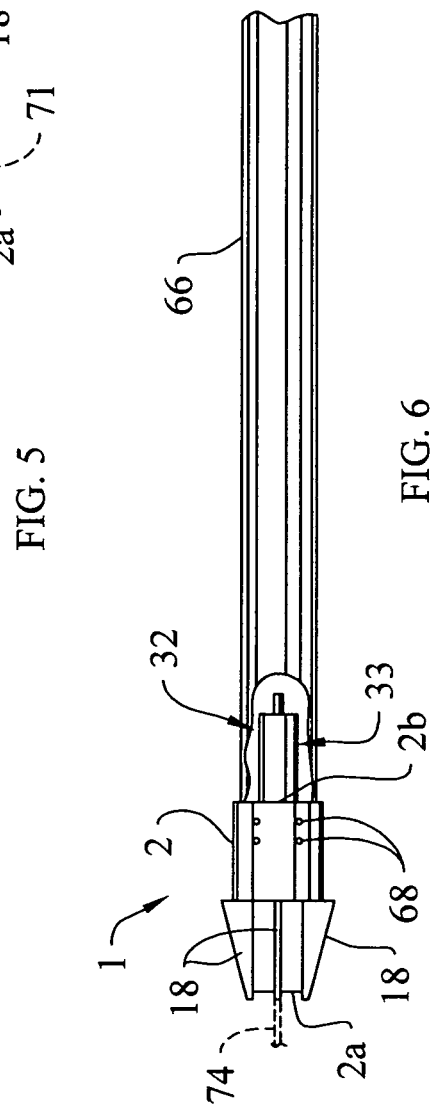

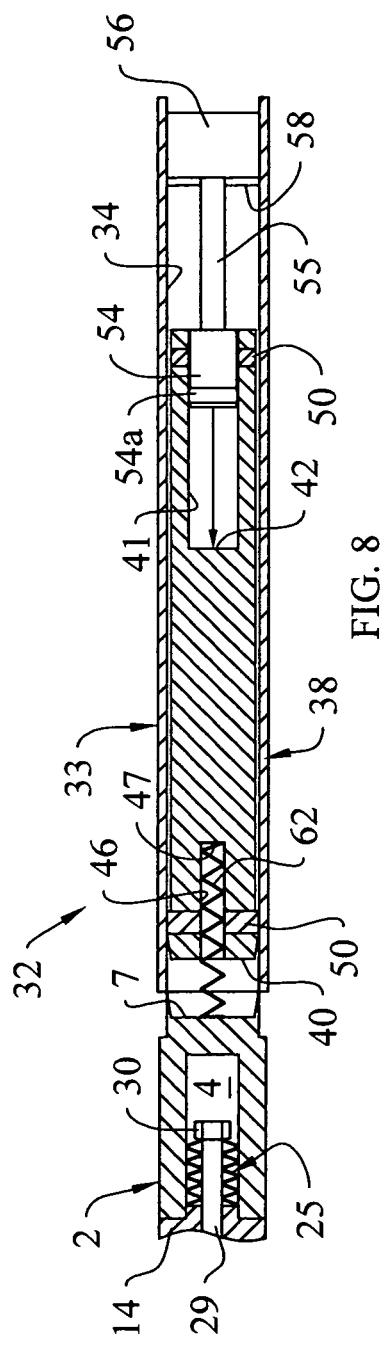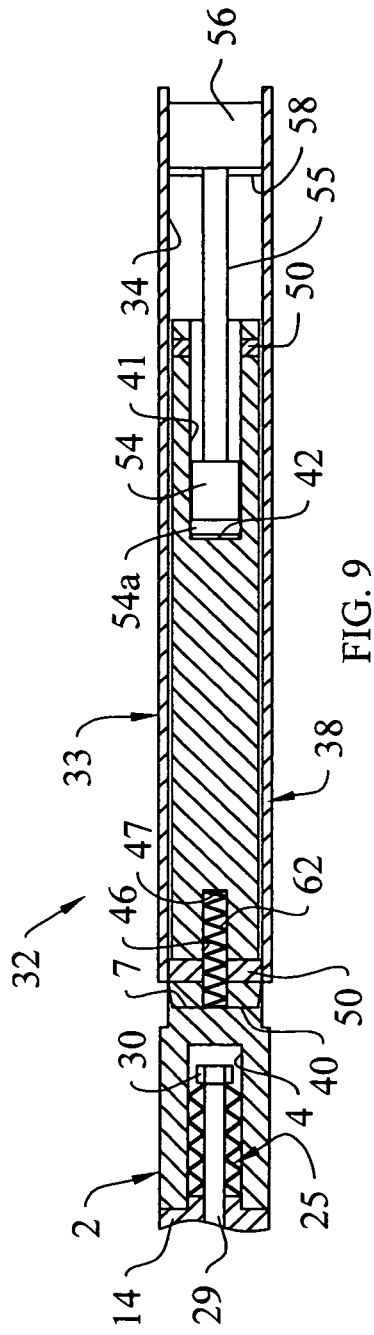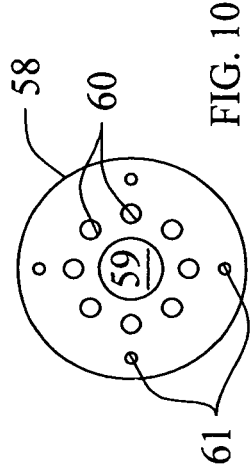

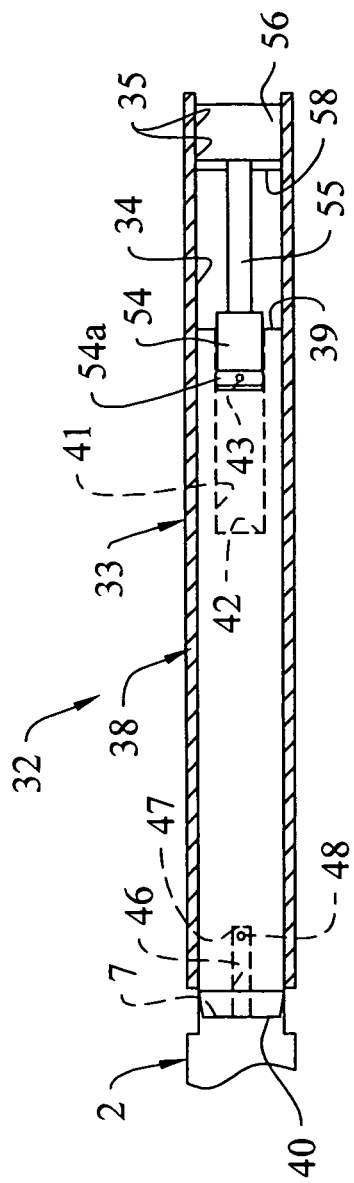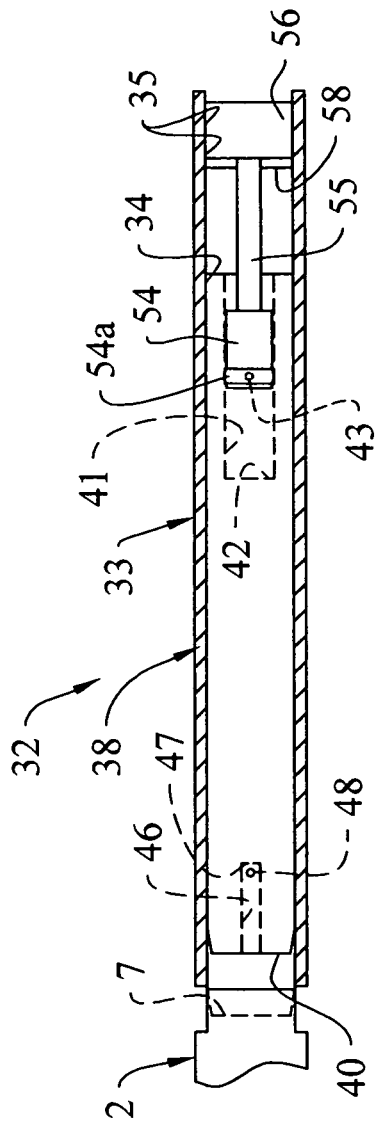

APPARATUS FOR BURSTING AND REPLACING CONDUITS

FIELD

Illustrative embodiments of the disclosure generally relate to devices for replacing underground conduits. More particularly, illustrative embodiments of the disclosure relate to an apparatus for progressively bursting a water, gas, sewer or other underground utility conduit and simultaneously drawing a replacement conduit into position behind the migrating burst point of the conduit being replaced.

BACKGROUND

Underground water, gas, sewer and other utility conduits typically require replacement after an extended period of use, frequently due to corrosion or damage to the conduits. Usually, digging trenches to expose the damaged conduits for replacement is undesirable since this frequently requires destruction of streets, sidewalks, parking lots or lawns, which is unsightly and expensive. To avoid these problems, various techniques and apparatuses have been devised to destroy the conduit in need of replacement and draw a new conduit into place without having to excavate trenches for the operation. Generally, the techniques involve excavating the ground at both ends of the conduit to be replaced and positioning a hydraulic pulling device of selected design in an excavation at one end of the conduit and a cutting tool in the other excavation at the opposite end of the conduit. A rod or cable is extended from the pulling device through the conduit and attached to the cutting tool at the opposite end of the conduit. As the hydraulic pulling device is operated to pull the cutting tool against the conduit, a pneumatic hammer typically intermittently and repeatedly strikes the cutting tool against the conduit, and the combined pulling action of the pulling device and striking action of the hammer on the cutting tool causes the tool to migrate and progressively cut and burst the conduit along the entire length of the conduit. A replacement conduit is typically attached to the cutting tool such that the replacement conduit is drawn into position behind the cutting tool as the cutting tool bursts the old conduit.

An apparatus for bursting and replacing conduits which is characterized by enhanced conduit bursting and replacing capability is needed.

SUMMARY

Illustrative embodiments of the disclosure are directed to an apparatus for bursting and replacing a conduit which is characterized by enhanced conduit bursting and replacing capability. An illustrative embodiment of the apparatus includes a stored energy and cutting head having a stored energy head cavity; an energy storing assembly including an energy storing head rod disposed in the stored energy head cavity, a washer retainer carried by the energy storing head rod and a plurality of cupped spring washers carried by the energy storing head rod and sandwiched between the washer retainer and the stored energy and cutting head: and a hammer assembly carried by the stored energy and cutting head.

BRIEF DESCRIPTION OF THE DRAWINGS

Illustrative embodiments of the disclosure will now be described, by way of example, with reference to the accompanying drawings, in which:

FIG. 1 is a perspective view, partially in section, of an illustrative embodiment of the apparatus for bursting and replacing conduits;

FIG. 2 is an exploded perspective view of the illustrative apparatus;

FIG. 2A is a cross-sectional view of multiple cupped spring washers of an exemplary energy storing assembly in a released energy state in implementation of the illustrative apparatus;

FIG. 3 is a longitudinal sectional view of the illustrative apparatus in bursting and replacing a conduit (illustrated in phantom), more particularly illustrating an energy storing assembly in a stored energy and cutting head of the apparatus disposed in a stored energy state and a hammer of the apparatus disposed in a pre-strike position preparatory to striking the stored energy and cutting head;

FIG. 5 is a side view of the illustrative apparatus in bursting a conduit during replacement of the conduit (illustrated in phantom);

FIG. 6 is a side view of the illustrative apparatus with the replacement conduit drawn in place behind the previously-busted conduit;

FIG. 8 is a longitudinal sectional view of the hammer assembly, with a hammer of the hammer assembly deployed in a pre-strike position relative to the stored energy and cutting head of the apparatus;

FIG. 9 is a longitudinal sectional view of the hammer assembly, with the hammer of the hammer assembly deployed in a strike position relative to the stored energy and cutting head;

FIG. 10 is a front view of a piston plate of the hammer assembly;

FIG. 11 is a longitudinal sectional view of the exemplary hammer assembly with the hammer in the strike position against the stored energy and cutting head and the hammer driving piston returned to the pre-strike position; and FIG. 12 is a longitudinal sectional view of the exemplary hammer assembly with the hammer and hammer driving piston returned to the pre-strike position.

DETAILED DESCRIPTION

Figure 4:
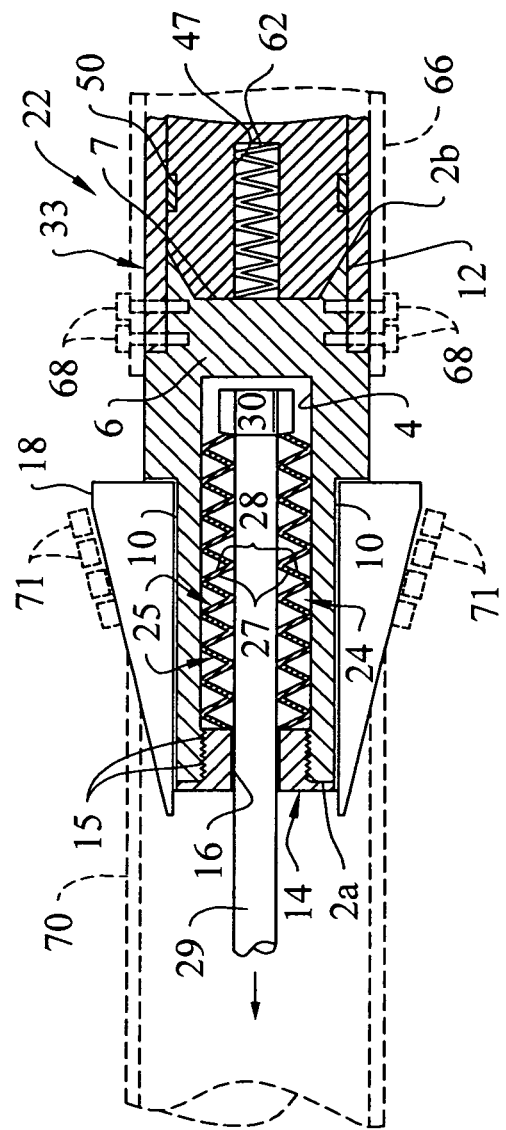
FIG. 4 is a longitudinal sectional view of the illustrative apparatus in bursting and replacing a conduit, with the energy storing assembly deployed in a released energy state and the hammer disposed in a strike position to augment the conduit-bursting action of the stored energy and cutting head of the apparatus.

The following detailed description is merely exemplary in nature an is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" herein are used with reference to relative positions of various elements with respect to each other in exemplary application of the magnetic firearm support and are not intended to be used in a limiting sense.

Referring initially to FIGS. 5, 6, 8 and 9 of the drawings, an illustrative embodiment of the apparatus for bursting and replacing conduit, hereinafter apparatus is generally indicated by reference numeral 1. The apparatus 1 includes a combined stored energy and cutting head 2 which is adapted to progressively cut and burst an underground conduit to be replaced 70 and replace the conduit to be replaced 70 with a replacement conduit 66. The apparatus 1 further includes a hammer assembly 32 (FIGS. 8 and 9) having a reciprocating hammer 38 which is adapted to repeatedly and intermittently strike the stored energy and cutting head 2. In exemplary application, which will be hereinafter described, the apparatus 1 is operated to progressively cut and burst the underground conduit to be replaced 70 and draw the conduit to be replaced 70 in place behind the migrating burst point of the replacement conduit 66. The replacement conduit 66 and the conduit to be replaced 70 may be a utility conduit such as a gas, water, sewer or other underground utility conduit, for example and without limitation.

To effect the conduit replacement operation, the apparatus 1 may be placed in a first excavation (not illustrated) at a first cutting head end of the underground conduit to be replaced 70. A hydraulic pull device (not illustrated) may be placed in a second excavation (not illustrated) at a second end of the conduit to be replaced 70. The replacement conduit 66 is attached to the combined stored energy and cutting head 2 such as in a manner which will be hereinafter described. A pull cable 74 is extended from the hydraulic pull device in the first excavation, through the conduit to be replaced 70 and attached to the stored energy and cutting head 2 in the second excavation. By operation of the hydraulic pull device, the pull cable 74 pulls the stored energy and cutting head 2 against the conduit to be replaced 70. Simultaneously, the reciprocating hammer 38 of the hammer assembly 32 repeatedly and intermittently strikes the stored energy and cutting head 2 against the conduit to be replaced 70. The combined pulling tension of the pull cable 74 and the repeated and intermittent striking action of the hammer 38 causes the stored energy and cutting head 2 to progressively cut and burst the conduit to be replaced 70 as the stored energy and cutting head 2 migrates from the first excavation along the conduit to be replaced 70 toward the second excavation. The stored energy and cutting head 2 draws the replacement conduit 66 in place behind the migrating burst point of the conduit to be replaced 70 until the stored energy and cutting head 2 reaches the end of the conduit to be replaced 70 at the second excavation and the replacement conduit 66 has completely replaced the entire length of the conduit to be replaced 70.

Referring next to FIGS. 1-4 of the drawings, the combined stored energy and cutting head 2 may include an outer wall 3 which may be generally elongated and cylindrical. As illustrated in FIGS. 3 and 4, a stored energy head cavity 4 may be formed by the outer wall 3. The stored energy head cavity 4 may be generally elongated and opens to a front cutting head end 2a of the stored energy and cutting head 2. A cavity divider wall 6 may close a rear end of the stored energy head cavity 4. A hammer seat 7 is provided in the cavity divider wall 6 at a rear cutting head end 2b of the stored energy and cutting head 2. The hammer seat 7 may be generally complementary in shape to an impact end 40 of the hammer 38. For example and without limitation, in some embodiments the hammer seat 7 may be generally concave to match the complementary convex shape of the impact end 40 of the hammer 38, as illustrated.

A blade seat 10 may be provided on the exterior surface of the outer wall 3 generally at the front portion of the stored energy and cutting head 2. Multiple conduit cutting blades 18 are provided on the blade seat 10. The conduit cutting blades 18 may be disposed in spaced-apart relationship to each other around the circumference of the blade seat 10. The conduit cutting blades 18 may be attached to the blade seat 10 using welding, brazing and/or other suitable attachment technique or may be casted or otherwise fabricated in one piece with the blade seat 10. A hammer assembly housing seat 12 may be provided on the exterior surface of the outer wall 3 generally at the rear portion of the stored energy/conduit cutting head 2. As illustrated in FIG. 2, fastener openings 20 may be provided in the hammer assembly housing seat 12 for purposes which will be hereinafter described.

A stored energy head cap 14 may close the stored energy head cavity 4 at the front cutting head end 2a of the stored energy and cutting head 2. The stored energy head cap 14 may have cap threads 15 which engage or mate with complementary housing threads 5 on the interior surface of the outer wall 3. A rod opening 16 extends through the stored energy head cap 14 for purposes which will be hereinafter described.

As further illustrated in FIGS. 3 and 4, an energy storing assembly 24 is provided in the stored energy head cavity 4 of the stored energy and cutting head 2. The energy storing assembly 24 may include an elongated energy storing head rod 29 which extends from outside the stored energy and cutting head 2 through the rod opening 16 in the stored energy head cap 14 and terminates inside the stored energy head cavity 4. In application of the apparatus 1, which will be hereinafter described, the energy storing head rod 29 is adapted for attachment to the pull cable 74 (FIGS. 5 and 6) which is engaged by the hydraulic pull device according to the knowledge of those skilled in the art. A washer retainer 30 may terminate the energy storing head rod 29 in the stored energy head cavity 4. In some embodiments, the washer retainer 30 may be detachable from the energy storing head rod 29 by threaded engagement, for example. Multiple, flexible or resilient cupped spring washers 25 (commonly known as Bellville washers) may be provided on the energy storing head rod 29 and sandwiched between the stored energy head cap 14 and the washer retainer 30. As illustrated in FIG. 3, between strikes of the hammer 38 of the hammer assembly 32 against the stored energy and cutting head 2, the pull cable 74 (FIGS. 5 and 6) applies a constant pulling tension or force 31 to the energy storing head rod 29. The cupped spring washers 25 transfer the pulling force of the energy storing head rod 29 to the stored energy and cutting head 2 at the stored energy head cap 14. Therefore, the cupped spring washers 25 are compressed between the stored energy head cap 14 and the washer retainer 30 on the energy storing head rod 29, as illustrated in FIG. 3.

Each time the hammer 38 of the hammer assembly 32 strikes the stored energy and cutting head 2, the stored energy and cutting head 2 is driven forward relative to the energy storing head rod 29. Consequently, the stored energy head cap 14 moves forward relative to the washer retainer 30 on the energy storing head rod 29 and the cupped spring washers 25 therefore expand against the stored energy head cap 14, augmenting the forward-driving action of the stored energy and cutting head 2 against the conduit to be replaced 70. As the hammer 38 subsequently disengages the stored energy and cutting head 2, the energy storing head rod 29 momentarily moves forward relative to the stored energy head cap 14 due to the pulling action of the pull cable 74. Therefore, the cupped spring washers 25 are again compressed between the stored energy head cap 14 and the washer retainer 30, as illustrated in FIG. 3. The compressed cupped spring washers 25 store energy to augment the forward movement force and cutting action of the stored energy and cutting head 2 as the hammer 38 subsequently again strikes the stored energy cutting head 2, as illustrated in FIG. 4. The constant pulling force of the pull cable 74 against the energy storing head rod 29, coupled with the hammer-driving action of the hammer assembly 32 augmented by the forward-driving potential energy of the cupped spring washers 25, continues as the stored energy and cutting head 2 traverses the entire length of the conduit to be replaced 70 and replaces the conduit to be replaced 70 with the replacement conduit 66.

As illustrated in FIG. 2A, each cupped spring washer 25 may have a concave washer surface 27 and a convex washer surface 28. A central rod opening 26 extends through the cupped spring washer 25 and accommodates the energy storing head rod 29. The concave washer surfaces 27 and the convex washer surfaces 28 of the consecutive cupped spring washers 25 are oriented on the energy storing head rod 29 in alternating relationship to each other. Therefore, the concave washer surfaces 27 of adjacent cupped spring washers 25 face each other and the convex washer surfaces 28 of adjacent cupped spring washers 25 face each other. This alternating orientation or the concave washer surfaces 27 and the convex washer surfaces 28 of the consecutive adjacent cupped spring washers 25 maximizes the stored energy which is released against the stored energy and cutting head 2 as the hammer 38 of the hammer assembly 32 strikes the stored energy and cutting head 2 as was heretofore described with respect to FIG. 4.

Referring next to FIGS. 7-12 of the drawings, the hammer assembly 32 of the apparatus 1 may include an elongated hammer assembly housing 33 having a housing interior 34. The hammer assembly housing 33 is adapted for attachment to the hammer assembly housing seat 12 of the stored energy and cutting head 2 such as by using fasteners 68 (FIGS. 2-4) or other suitable attachment technique known by those skilled in the art. The hammer 38 is disposed for bidirectional axial displacement in the housing interior 34 of the hammer assembly housing 33. The hammer 38 may have a piston end 39 and a typically tapered impact end 40 opposite the piston end 39. A piston cavity 41 extends into the piston end 39 toward the impact end 40. The piston cavity 41 may have a recessed piston strike surface 42. A spring cavity 46 extends into the impact end 40 toward the piston end 39. The spring cavity 46 may have a recessed spring engaging surface 47. A pair of hammer seals 50 may be provided on the exterior of the hammer 38 at the piston end 39 and the impact end 40, respectively, to pneumatically seal the hammer 38 in the housing interior 34 of the hammer assembly housing 33.

The hammer 38 is positional in the housing interior 34 of the hammer assembly housing 33 between a pre-strike position (FIG. 8) and a strike position (FIG. 9) relative to the stored energy and cutting head 2. As illustrated in FIG. 8, in the pre-strike position, the impact end 40 of the hammer 38 disengages the hammer seat 7 of the stored energy and cutting head 2. The cupped spring washers 25 (FIG. 3) are compressed between the stored energy head cap 14 and the washer retainer 30 on the energy storing head rod 29 as was heretofore described with respect to FIG. 3. As illustrated in FIG. 9, in the strike position, the impact end 40 of the hammer 38 strikes and engages the hammer seat 7 of the stored energy cutting head 2 to drive the stored energy cutting head 2 forwardly against the conduit to be replaced 70 (FIG. 5) in conjunction with the pulling action of the energy storing head rod 29. Simultaneously, the cupped spring washers 25 (FIG. 4) expand to augment the forward driving force of the stored energy head 2 against the conduit to be replaced 70.

A reciprocating hammer driving piston 54 is disposed in the piston cavity 41 of the hammer 38. A piston seal 54a may be provided on the hammer driving piston 54 to impart a pneumatic seal with the interior surface of the piston cavity 41. The hammer driving piston 54 may be engaged by a piston plunger 55. A piston reciprocating mechanism 56 drivingly engages the piston plunger 55. The piston reciprocating mechanism 56 may be threadably attached to the interior of the hammer assembly housing 33 via housing threads 35. The piston reciprocating mechanism 56 may be a pneumatic piston driving mechanism having any design which is known by those skilled in the art and is suitable for reciprocating the piston plunger 55 and hammer driving piston 54 in the hammer assembly housing 33. Accordingly, the piston reciprocating mechanism 56 is operable to extend the hammer driving piston 54 until the hammer driving piston 54 strikes the piston strike surface 42 in the piston cavity 41 and drives the hammer 38 from the pre-strike position of FIG. 8 to the strike position of FIG. 9. The piston reciprocating mechanism 56 then retracts the hammer driving piston 54 back to the pre-strike position of FIG. 8 in which the hammer driving piston 54 disengages the piston strike surface 42.

Figure 7:
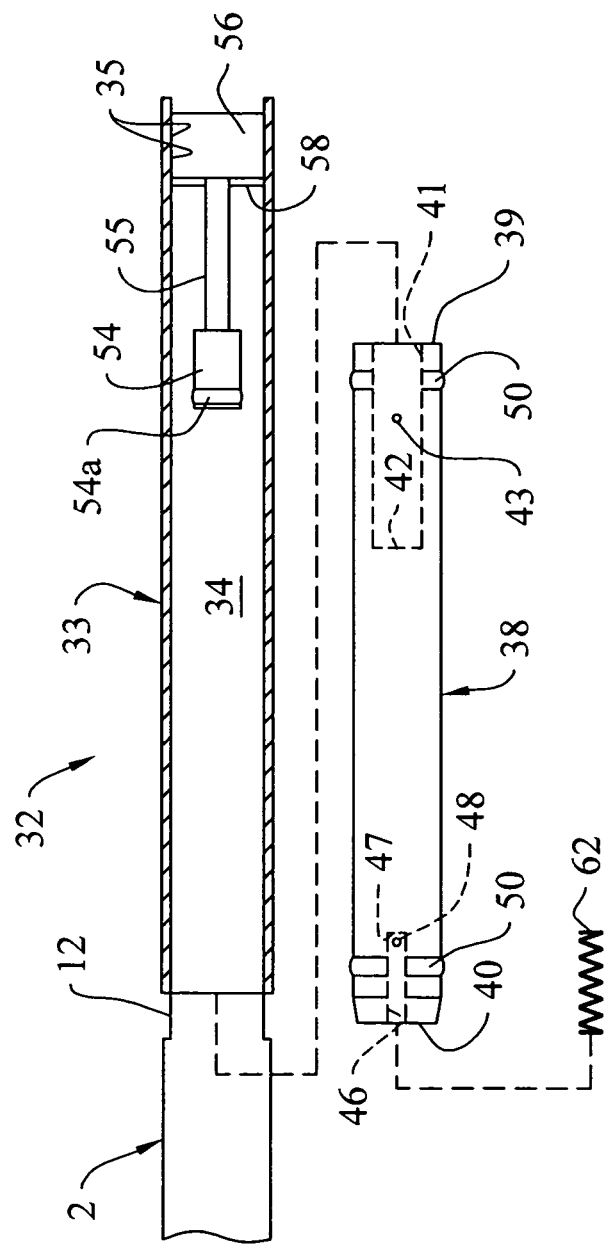
FIG. 7 is an exploded side view, partially in section, of a hammer assembly of the illustrative apparatus.

As illustrated in FIGS. 8 and 9, a piston plate 58 may be provided on the piston reciprocating mechanism 56 in facing relationship to the hammer driving piston 54. The piston plate 58 may be polyethylene or other suitable material. As illustrated in FIG. 10, the piston plate 58 may have a central plunger opening 59 which accommodates the piston plunger 55. Multiple air vent openings 60 may extend through the piston plate 58 in surrounding relationship to the plunger opening 59. The air vent openings 60 may facilitate flow of air between the housing interior 34 of the hammer assembly housing 33 and the exterior of the hammer assembly housing 33 as the hammer driving piston 54 reciprocates in the piston cavity 41. The piston plate 58 may be attached to the piston reciprocating mechanism 56 such as by extending fasteners (not illustrated) through fastener openings 61 and threading the fasteners in registering fastener openings (not illustrated) in the piston reciprocating mechanism As illustrated in FIG. 7, an air vent opening 43 may extend through the wall of the hammer assembly housing 33 and communicate with the piston cavity 41. An air pressure opening 48 may likewise extend through the wall of the hammer assembly housing 33 and communicate with the spring cavity 46. A pressurized air source (not illustrated) may be disposed in fluid communication with the air pressure opening 48. Therefore, pressurized air may be introduced into the spring cavity 46 through the air pressure opening 48 to exert air pressure against the spring engaging surface 47 and return the hammer 38 from the strike position of FIG. 9 back to the pre-strike position of FIG. 8. As the hammer 38 returns to the pre-strike position, air may escape from the piston cavity 41 through the air vent opening 43.

As illustrated in FIG. 11, in operation of the hammer assembly 32, after the hammer 38 strikes the stored energy and cutting head 2 the hammer driving piston 54 may have a tendency to return to the pre-strike position while the hammer 38 remains in the strike position. Therefore, the air vent opening 43 may be inadvertently sealed by the piston seal 54a on the hammer driving piston 54. This may hinder escape of air from the piston cavity 41 through the air vent opening 43 as the spring cavity 46 is pressurized, creating an air lock in the piston cavity 41 which prevents return of the hammer 38 back to the pre-strike position (FIG. 12). This phenomenon may cause the hammer 38 to "hang up" in the hammer assembly housing 33, otherwise preventing or hindering continuous operation of the hammer assembly 32. Therefore, as illustrated in FIGS. 8 and 9, a hammer return spring 62 may be provided in the spring cavity 46. The opposite ends of the hammer return spring 62 may engage the spring engaging surface 47 of the spring cavity 46 and the hammer seat 7 of the stored energy and cutting head 2. In the pre-strike position of the hammer 38 (FIG. 8), the hammer return spring 62 is expanded whereas in the strike position of the hammer 38 (FIG. 9) the hammer return spring 62 is compressed. Accordingly, the hammer return spring 62 ensures that the hammer 38 returns from the strike position of FIGS. 9 and 11 back to the pro-strike position of FIGS. 8 and 12 even though the air vent opening 43 is inadvertently sealed by the piston seal 54a on the hammer driving piston 54, as illustrated in FIG. 11.

In exemplary application, the apparatus 1 is operated to progressively cut and burst the underground conduit to be replaced 70 and replace the conduit 70 with the replacement conduit 66. As illustrated in FIG. 2, the replacement conduit 66 may be attached to the stored energy and cutting head 2 by inserting the front or leading end of the replacement conduit 66 over the hammer assembly housing seat 12. Fasteners 68 may be inserted through fastener openings 36 in the replacement conduit 66 and through registering fastener openings (not illustrated) in the underlying hammer assembly housing 33 of the hammer assembly 32. Accordingly, the hammer assembly housing 33 is disposed inside the replacement conduit 66 and the hammer 38 is disposed for axial displacement inside the hammer assembly housing 33, as was heretofore described with respect to FIGS. 8-12.

First and second excavations (not illustrated) are made in the ground at the respective ends of the subterranean replacement conduit 66. The apparatus 1 is placed in the first excavation and a hydraulic pull device (not illustrated) is placed in the second excavation. The hydraulic pull device may be any type of pull device or apparatus having a pull cable 74 (FIGS. 5 and 6) which can be attached to the energy storing head rod 29 of the energy storing assembly 24 to pull the stored energy and cutting head 2 against the conduit to be replaced 70. An example of a hydraulic pull device which is suitable for the purpose is described in U.S. Pat. No. 6,537,967, which is incorporated by reference herein in its entirety.

The pull cable 74 (FIGS. 5 and 6) is extended from the hydraulic pull device in the first excavation, through the conduit to be replaced 70 and attached to the energy storing head rod 29 of the stored energy and cutting head 2 in the second excavation. The hydraulic pull device is then operated to pull the pull cable 74 and the energy storing head rod 29 forwardly such that the washer retainer 30 (FIGS. 3 and 4) on the energy storing head rod 29 moves forward toward the initially stationary stored energy head cap 14. This action compresses the cupped spring washers 25 between the washer retainer 30 and the stored energy head cap 14, as illustrated in FIG. 3. Therefore, the compressed cupped spring washers 25 push forwardly against the stored energy head cap 14 such that the conduit cutting blades 18 exert pressure against the end of the replaced conduit 70. Thus, the conduit cutting blades 18 progressively cut and burst the replaced conduit 70, forming broken conduit particles 71 as the stored energy and cutting head 2 migrates along the conduit to be replaced 70 toward the hydraulic pull device in the second excavation.

Responsive to the constant pulling action of the pull cable 74 against the energy storing head rod 29, the cupped spring washers 25 remain compressed between the washer retainer 30 and the stored energy head cap 14. Therefore, potential energy is stored in the cupped spring washers 25. Simultaneously, the hammer 38 in the hammer assembly housing 33 of the hammer assembly 32 repeatedly and intermittently strikes the hammer seat 7 in the rear end of the stored energy and cutting head 2. The combined pulling action of the pull cable 74 on the energy storing head rod 29 and the repeated and intermittent striking action of the hammer 38 against the stored energy and cutting head 2 augments the forward cutting action of the conduit cutting blades 18 on the conduit to be replaced 70 as the stored energy and cutting head 2 bursts and migrates along the conduit to be replaced 70. Moreover, each time the hammer 38 strikes the stored energy and cutting head 2, the stored energy head cap 14 moves forwardly on the energy storing head rod 29 relative to the washer retainer 30. Therefore, the initially compressed cupped spring washers 25 expand on the energy storing head rod 29, as illustrated in FIG. 4, releasing the potential energy stored in the compressed cupped spring washers 25. The potential energy which is released by the expanding cupped spring washers 25 causes the cupped spring washers 25 to push forwardly against the stored energy head cap 14, further augmenting the forward cutting action of the conduit cutting blades 18 against the replaced conduit 70 which is imparted by the hammer 38 impacting the stored energy and cutting head 2. As it migrates along the conduit to be replaced 70, the stored energy and cutting head 2 draws the replacement conduit 66 in place behind the migrating burst point of the conduit to be replaced 70 until the stored energy and cutting head 2 reaches the end of the conduit to be replaced 70 at the second excavation. At that point, the replacement conduit 66 has completely replaced the entire length of the conduit to be replaced 70. The replacement conduit 66 is detached from the stored energy and cutting head 2 which, along with the hydraulic pull device, is removed from the second excavation. After the replacement conduit 66 is connected to the main utility line, the first and second excavations may be filled.

Throughout operation of the apparatus 1, the hammer 38 repeatedly and intermittently strikes the hammer seat 7 of the stored energy and cutting head 2 to release the potential energy stored in the cupped spring washers 25 and augment the cutting action of the conduit cutting blades 18 on the conduit to be replaced 70, as was heretofore described. As was heretofore described with respect to FIGS. 8 and 9, the hammer 38 is driven against the hammer seat 7 as the hammer driving piston 54 strikes the piston strike surface 42 in the piston cavity 41 of the hammer 38. After each stroke of the hammer 38, pressurized air may be introduced into the spring cavity 46 through the air pressure opening 48 (FIG. 11) to exert air pressure against the spring engaging surface 47 and return the hammer 38 from the strike position of FIG. 9 back to the pre-strike position of FIG. 8. As the hammer 38 returns to the pre-strike position, air may escape from the piston cavity 41 through the air vent opening 43. However, under circumstances in which the hammer driving piston 54 returns to the pre-strike position before the hammer 38, the air vent opening 43 may be inadvertently sealed by the piston seal 54a on the hammer driving piston 54, as illustrated in FIG. 11, creating an air lock in the piston cavity 41 and hindering escape of air from the piston cavity 41 through the air vent opening 43 as the spring cavity 46 is pressurized. This may otherwise prevent or hinder return of the hammer 38 back to the pre-strike position illustrated in FIG. 12 and cause the hammer 38 to "hang up" in the hammer assembly housing 33. However, as illustrated in FIGS. 8 and 9, the hammer return spring 62 in the spring cavity 46 ensures that the hammer 38 returns to the pre-strike position of FIGS. 8 and 12 such that the hammer 38 is properly positioned for the next stroke. This expedient ensures smooth and continuous operation of the hammer assembly 32 in conjunction with the stored energy and cutting head 2 throughout operation of the apparatus 1. One or more of the cupped spring washers 25 can be replaced, as deemed necessary, by unthreading the stored energy head cap 14 from the housing threads 5 in the stored energy head cavity 4; removing the energy storing head rod 29 from the stored energy head cavity 4; removing the washer retainer 30 from the energy storing head rod 29; removing the cupped spring washer or washers 25 to be replaced from the energy storing head rod 29; replacing the cupped spring washer or washers 25 and the washer retainer 30 on the energy storing head rod 29; and re-attaching the stored energy head cap 14 to the housing threads 5.

While exemplary embodiments of the disclosure have been described above, it will be recognized and understood that various modifications can be made in the disclosure and the appended claims are intended to cover all such modifications which may fall within the spirit and scope of the disclosure.

What is claimed is:

1. An apparatus for bursting and replacing a conduit, comprising:
   a stored energy and cutting head having a stored energy head cavity and a stored energy head cap closing the stored energy head cavity;
   an energy storing assembly including:
      an energy storing head rod disposed in the stored energy head cavity;
      a washer retainer carried by the energy storing head rod; and
      a plurality of cupped spring washers carried by the energy storing head rod and sandwiched between the washer retainer and the stored energy head cap of the stored energy and cutting head; and
   a hammer assembly carried by the stored energy and cutting head and including:
      a hammer assembly housing carried by the stored energy and cutting head;
      a hammer disposed for axial displacement in the hammer assembly housing;
      a spring cavity in the hammer;
      a hammer return spring in the spring cavity, the hammer return spring interposed between the hammer and the stored energy and cutting head;
      an air pressure opening in the hammer and communicating with the spring cavity;
      a piston cavity extending into the piston end of the hammer;
      an air vent opening in the hammer and communicating with the piston cavity; and
      a hammer driving piston adapted to engage the piston cavity in the hammer for displacement in the hammer assembly housing against the stored energy and cutting head.

2. The apparatus of claim 1 wherein the stored energy head cap comprises a rod opening accommodating the energy storing head rod,.

3. The apparatus of claim 1 wherein the stored energy and cutting head comprises an outer wall defining the stored energy head cavity, a cavity divider wall extending from the outer wall and closing the stored energy head cavity and a hammer seat in the cavity divider wall opposite the stored energy head cavity.

4. The apparatus of claim 3 further comprising a blade seat in the outer wall and a plurality of conduit cutting blades carried by the blade seat.

5. The apparatus of claim 1 wherein each of the plurality of cupped spring washers comprises a concave washer surface and a convex washer surface, and the concave washer surfaces and the convex washer surfaces of consecutive cupped spring washers are oriented on the energy storing head rod in alternating relationship to each other.

6. An apparatus for bursting and replacing a conduit, comprising:
   a stored energy and cutting head having a stored energy head cavity and a stored energy head cap closing the stored energy head cavity;
   an energy storing assembly including:
      an energy storing head rod disposed in the stored energy head cavity;
      a washer retainer carried by the energy storing head rod; and
      a plurality of cupped spring washers carried by the energy storing head rod and sandwiched between the washer retainer and the stored energy head cap of the stored energy and cutting head; and
   a hammer assembly carried by the stored energy and cutting head and including:
      a hammer assembly housing carried by the stored energy and cutting head;
      a hammer disposed for axial displacement in the hammer assembly housing;
      a spring cavity in the hammer;
      an air pressure opening in the hammer and communicating with the spring cavity;
      a hammer driving piston adapted to engage the hammer for displacement in the hammer assembly housing against the stored energy and cutting head; and
      a hammer return spring disposed in the spring cavity, the hammer return spring interposed between the hammer and the stored energy and cutting head.

7. The apparatus of claim 6 The apparatus of claim 1 wherein the stored energy head cap comprises a rod opening accommodating the energy storing head rod.

8. The apparatus of claim 6 wherein the stored energy and cutting head comprises an outer wall defining the stored energy head cavity, a cavity divider wall extending from the outer wall and closing the stored energy head cavity and a hammer seat in the cavity divider wall opposite the stored energy head cavity.

9. The apparatus of claim 8 further comprising a blade seat in the outer wall and a plurality of conduit cutting blades carried by the blade seat and a hammer assembly housing seat in the outer wall and wherein the hammer assembly housing engages the hammer assembly housing seat.

10. The apparatus of claim 6 wherein each of the plurality of cupped spring washers comprises a concave washer surface and a convex washer surface, and the concave washer surfaces and the convex washer surfaces of consecutive cupped spring washers are oriented on the energy storing head rod in alternating relationship to each other.

11. The apparatus of claim 6 further comprising: a hammer seat in the stored energy and cutting head and wherein the hammer return spring engages the hammer seat.

12. An apparatus for bursting and replacing a conduit, comprising:
   a stored energy and cutting head having a first cutting head end, a second cutting head end opposite the first cutting head end, a stored energy head cavity extending into the first cutting head end, a hammer seat at the second cutting head end, a stored energy head cap having a rod opening closing the stored energy head cavity at the first cutting head end and a plurality of conduit cutting blades;

an energy storing assembly including:
  an energy storing head rod disposed in and extending from the stored energy head cavity through the rod opening of the stored energy head cap;
  a washer retainer carried by the energy storing head rod in spaced-apart relationship to the stored energy head cap; and
  a plurality of cupped spring washers carried by the energy storing head rod and sandwiched between the washer retainer and the stored energy head cap; and a hammer assembly carried by the stored energy and cutting head and including:
  a hammer assembly housing carried by the stored energy and cutting head;
  a hammer disposed for axial displacement in the hammer assembly housing and having an impact end and a piston end opposite the impact end;
  a spring cavity having a recessed spring engaging surface extending into the impact end of the hammer;
  an air pressure opening in the hammer and communicating with the spring cavity;
  a piston cavity extending into the piston end of the hammer;
  an air vent opening in the hammer and communicating with the piston cavity;
  a hammer driving piston adapted to engage the hammer for displacement in the hammer assembly housing against the hammer seat of the stored energy and cutting head; and
  a hammer return spring seated in the spring cavity and interposed between the spring engaging surface in the spring cavity and the hammer seat on the stored energy and cutting head.

13. The apparatus of claim 12 further comprising a blade seat in the stored energy and cutting head at the first cutting head end and a hammer assembly housing seat in the stored energy and cutting head at the second end, and wherein the plurality of conduit cutting blades is carried by the blade seat and the hammer assembly housing of the hammer assembly is carried by the hammer assembly housing seat.

14. The apparatus of claim 12 wherein the stored energy and cutting head comprises an outer wall defining the stored energy head cavity and a cavity divider wall extending from the outer wall and closing the stored energy head cavity, and wherein the hammer seat is in the cavity divider wall.

15. The apparatus of claim 12 wherein each of the plurality of cupped spring washers comprises a concave washer surface and a convex washer surface, and the concave washer surfaces and the convex washer surfaces of consecutive cupped spring washers are oriented on the energy storing head rod in alternating relationship to each other.

* * * * *